US011346951B2

(12) United States Patent
Lu et al.

(10) Patent No.: US 11,346,951 B2
(45) Date of Patent: *May 31, 2022

(54) OBJECT DETECTION SYSTEM

(71) Applicant: MAGNA ELECTRONICS INC., Auburn Hills, MI (US)

(72) Inventors: Yuesheng Lu, Farmington Hills, MI (US); Michael J. Higgins-Luthman, Livonia, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 552 days.

This patent is subject to a terminal disclaimer.

(21) Appl. No.: 16/413,677

(22) Filed: May 16, 2019

(65) Prior Publication Data

US 2019/0277968 A1 Sep. 12, 2019

Related U.S. Application Data

(63) Continuation of application No. 15/196,076, filed on Jun. 29, 2016, now Pat. No. 10,295,667, which is a (Continued)

(51) Int. Cl.
*G01S 17/86* (2020.01)
*B60R 1/00* (2022.01)
(Continued)

(52) U.S. Cl.
CPC .............. *G01S 17/86* (2020.01); *B60R 1/00* (2013.01); *G01S 7/4802* (2013.01);
(Continued)

(58) Field of Classification Search
CPC ...... G01S 17/86; G01S 17/931; G01S 7/4802; G01S 7/4814; G01S 7/4865; G01S 17/58;
(Continued)

(56) References Cited

U.S. PATENT DOCUMENTS

| 5,249,157 A | 9/1993 | Taylor |
| 5,296,909 A | 3/1994 | Fazi et al. |

(Continued)

FOREIGN PATENT DOCUMENTS

EP     1835475 A1 *  9/2007    ........... G01S 17/931

*Primary Examiner* — Luke D Ratcliffe
(74) *Attorney, Agent, or Firm* — Honigman LLP

(57) ABSTRACT

An object detection system for a vehicle includes a camera vision module and a Lidar module. The camera vision module includes an imaging device viewing to the exterior of the vehicle and operable to capture image data representative of a scene exterior and forward of the vehicle. The Lidar module includes a Lidar device that, with the Lidar module mounted at a front exterior portion of the vehicle, scans a region forward of the vehicle that overlaps with the field of view of the imaging device. Based at least in part on processing of captured image data by an image processor and based at least in part on processing of Lidar data captured by the Lidar device, 3-dimensional and timing information relative to the vehicle of objects present exterior of the vehicle is algorithmically constructed. At least one individual object of the multiple objects is prioritized.

65 Claims, 4 Drawing Sheets

Related U.S. Application Data continuation of application No. 14/319,164, filed on Jun. 30, 2014, now Pat. No. 9,383,445, which is a continuation of application No. 13/242,991, filed on Sep. 23, 2011, now Pat. No. 8,767,186, which is a continuation of application No. 12/266,656, filed on Nov. 7, 2008, now Pat. No. 8,027,029.

(60) Provisional application No. 60/986,016, filed on Nov. 7, 2007.

(51) Int. Cl.
| | | |
|---|---|---|
| *G01S 7/48* | (2006.01) | |
| *G01S 7/481* | (2006.01) | |
| *G01S 17/58* | (2006.01) | |
| *G06T 7/70* | (2017.01) | |
| *G01S 17/931* | (2020.01) | |
| *G06V 10/20* | (2022.01) | |
| *G06V 20/58* | (2022.01) | |
| *G01C 3/08* | (2006.01) | |
| *B60Q 9/00* | (2006.01) | |
| *H04N 5/217* | (2011.01) | |
| *H04N 5/33* | (2006.01) | |
| *G06T 5/50* | (2006.01) | |
| *G01S 7/4865* | (2020.01) | |
| *G06V 10/147* | (2022.01) | |
| *H04N 5/225* | (2006.01) | |

(52) U.S. Cl.
CPC .......... *G01S 7/4817* (2013.01); *G01S 7/4865* (2013.01); *G01S 17/58* (2013.01); *G01S 17/931* (2020.01); *G06T 5/50* (2013.01); *G06T 7/70* (2017.01); *G06V 10/147* (2022.01); *G06V 10/255* (2022.01); *G06V 20/58* (2022.01); *H04N 5/217* (2013.01); *H04N 5/2257* (2013.01); *H04N 5/33* (2013.01); *B60Q 9/008* (2013.01); *B60R 2300/8033* (2013.01); *B60R 2300/8093* (2013.01); *G01C 3/08* (2013.01); *G06T 2207/10016* (2013.01); *G06T 2207/10048* (2013.01); *G06T 2207/30252* (2013.01); *G06T 2207/30261* (2013.01); *G06V 2201/07* (2022.01)

(58) Field of Classification Search
CPC ......... G01S 17/89; G01S 17/894; G06T 7/70; G06T 5/50; G06T 2207/10016; G06T 2207/10048; G06T 2207/30252; G06T 2207/30261; B60R 1/00; B60R 2300/8033; B60R 2300/8093; G06K 9/00805; G06K 9/209; G06K 9/3241; G06K 2209/21; H04N 5/217; H04N 5/2257; H04N 5/33; B60Q 9/008; G01C 3/08
See application file for complete search history.

(56) References Cited

U.S. PATENT DOCUMENTS

| | | |
|---|---|---|
| 5,341,142 A | 8/1994 | Reis et al. |
| 5,343,206 A | 8/1994 | Ansaldi et al. |
| 5,378,888 A | 1/1995 | Stappaerts |
| 5,408,541 A | 4/1995 | Sewell |
| 5,550,677 A | 8/1996 | Schofield et al. |
| 5,572,428 A | 11/1996 | Ishida et al. |
| 5,594,414 A | 1/1997 | Namngani |
| 5,617,085 A | 4/1997 | Tsutsumi et al. |
| 5,627,510 A | 5/1997 | Yuan |
| 5,627,518 A | 5/1997 | Wishart |
| 5,670,935 A | 9/1997 | Schofield et al. |
| 5,734,736 A | 3/1998 | Palmer et al. |
| 5,745,050 A | 4/1998 | Nakagawa |
| 5,784,023 A | 7/1998 | Bluege |
| 5,796,094 A | 8/1998 | Schofield et al. |
| 5,877,897 A | 3/1999 | Schofield et al. |
| 5,939,987 A | 8/1999 | Cram |
| 5,949,366 A | 9/1999 | Herrmann |
| 6,035,053 A | 3/2000 | Yoshioka et al. |
| 6,085,151 A | 7/2000 | Farmer et al. |
| 6,097,023 A | 8/2000 | Schofield et al. |
| 6,122,040 A | 9/2000 | Arita et al. |
| 6,215,731 B1 | 4/2001 | Smith |
| 6,229,597 B1 | 5/2001 | Kikuchi |
| 6,256,565 B1 | 7/2001 | Yanagi et al. |
| 6,281,806 B1 | 8/2001 | Smith et al. |
| 6,313,454 B1 | 11/2001 | Bos et al. |
| 6,320,176 B1 | 11/2001 | Schofield et al. |
| 6,396,397 B1 | 5/2002 | Bos et al. |
| 6,405,132 B1 | 6/2002 | Breed et al. |
| 6,498,620 B2 | 12/2002 | Schofield et al. |
| 6,559,435 B2 | 5/2003 | Schofield et al. |
| 6,587,186 B2 | 7/2003 | Bamji et al. |
| 6,657,705 B2 | 12/2003 | Sano et al. |
| 6,674,895 B2 | 1/2004 | Rafii et al. |
| 6,675,094 B2 | 1/2004 | Russell et al. |
| 6,678,039 B2 | 1/2004 | Charbon |
| 6,690,354 B2 | 2/2004 | Sze |
| 6,710,770 B2 | 3/2004 | Tomasi et al. |
| 6,804,607 B1 | 10/2004 | Wood |
| 6,806,452 B2 | 10/2004 | Bos et al. |
| 6,819,407 B2 | 11/2004 | Arita et al. |
| 6,825,455 B1 | 11/2004 | Schwarte |
| 6,831,261 B2 | 12/2004 | Schofield et al. |
| 6,860,350 B2 | 3/2005 | Beuhler et al. |
| 6,876,775 B2 | 4/2005 | Torunoglu |
| 6,906,793 B2 | 6/2005 | Bamji et al. |
| 6,919,549 B2 | 7/2005 | Bamji et al. |
| 6,946,978 B2 | 9/2005 | Schofield |
| 6,956,227 B2 | 10/2005 | Miyazaki et al. |
| 7,004,606 B2 | 2/2006 | Schofield |
| 7,005,974 B2 | 2/2006 | McMahon et al. |
| 7,014,003 B2 | 3/2006 | Polak |
| 7,026,600 B2 | 4/2006 | Jamieson et al. |
| 7,053,357 B2 | 5/2006 | Schwarte |
| 7,123,168 B2 | 10/2006 | Schofield |
| 7,124,027 B1 | 10/2006 | Ernst, Jr. et al. |
| 7,157,685 B2 | 1/2007 | Bamji et al. |
| 7,176,438 B2 | 2/2007 | Bamji et al. |
| 7,203,356 B2 | 4/2007 | Gokturk et al. |
| 7,209,221 B2 | 4/2007 | Breed et al. |
| 7,212,663 B2 | 5/2007 | Tomasi |
| 7,250,853 B2 | 7/2007 | Flynn |
| 7,283,213 B2 | 10/2007 | O'Connor et al. |
| 7,310,431 B2 | 12/2007 | Gokturk et al. |
| 7,321,111 B2 | 1/2008 | Bamji et al. |
| 7,340,077 B2 | 3/2008 | Gokturk et al. |
| 7,347,595 B2 | 3/2008 | Brun et al. |
| 7,352,454 B2 | 4/2008 | Bamji et al. |
| 7,359,782 B2 | 4/2008 | Breed |
| 7,375,803 B1 | 5/2008 | Bamji |
| 7,379,100 B2 | 5/2008 | Gokturk et al. |
| 7,379,163 B2 | 5/2008 | Rafii et al. |
| 7,394,356 B2 | 7/2008 | Kumabe et al. |
| 7,405,812 B1 | 7/2008 | Bamji |
| 7,408,627 B2 | 8/2008 | Bamji et al. |
| 7,409,295 B2 | 8/2008 | Paradie |
| 7,440,084 B2 | 10/2008 | Kane |
| 7,544,945 B2 | 6/2009 | Tan et al. |
| 7,617,048 B2 | 11/2009 | Simon et al. |
| 7,646,884 B2 | 1/2010 | Remillard et al. |
| 7,702,425 B2 | 4/2010 | Hougen |
| 7,782,184 B2 | 8/2010 | Wittorf et al. |
| 7,914,187 B2 | 3/2011 | Higgins-Luthman et al. |
| 8,027,029 B2 | 9/2011 | Lu et al. |
| 8,082,101 B2 | 12/2011 | Stein et al. |
| 8,125,622 B2 | 2/2012 | Gammenthaler |
| 8,195,387 B2 | 6/2012 | Moritz et al. |
| 8,400,511 B2 | 3/2013 | Wood et al. |
| 8,610,881 B2 | 12/2013 | Gammenthaler |

(56) References Cited

U.S. PATENT DOCUMENTS

| | | |
|---|---|---|
| 8,767,186 B2 | 7/2014 | Lu et al. |
| 9,383,445 B2 | 7/2016 | Lu et al. |
| 10,295,667 B2 | 5/2019 | Lu et al. |
| 2002/0005778 A1 | 1/2002 | Breed et al. |
| 2002/0134151 A1 | 9/2002 | Naruoka et al. |
| 2003/0090647 A1 | 5/2003 | Isogai et al. |
| 2003/0191568 A1 | 10/2003 | Breed |
| 2004/0150514 A1 | 8/2004 | Newman et al. |
| 2004/0254729 A1 | 12/2004 | Browne et al. |
| 2004/0258279 A1 | 12/2004 | Hirvonen et al. |
| 2005/0084156 A1 | 4/2005 | Das et al. |
| 2005/0189503 A1 | 9/2005 | Jamieson et al. |
| 2005/0195383 A1 | 9/2005 | Breed et al. |
| 2005/0232463 A1 | 10/2005 | Hirvonen et al. |
| 2005/0273212 A1 | 12/2005 | Hougen |
| 2006/0041381 A1 | 2/2006 | Simon et al. |
| 2006/0132752 A1 | 6/2006 | Kane |
| 2006/0139162 A1 | 6/2006 | Flynn |
| 2006/0195231 A1 | 8/2006 | Diebold et al. |
| 2007/0146195 A1 | 6/2007 | Wallenberg et al. |
| 2007/0181810 A1 | 8/2007 | Tan et al. |
| 2007/0182528 A1 * | 8/2007 | Breed .................. G01S 11/12 340/435 |
| 2007/0237398 A1 | 10/2007 | Chang et al. |
| 2009/0237668 A1 | 9/2009 | Reyes, Jr. et al. |
| 2009/0278709 A1 | 11/2009 | Endo et al. |
| 2012/0008129 A1 | 1/2012 | Lu et al. |
| 2012/0154788 A1 | 6/2012 | Gammenthaler |
| 2012/0257792 A1 | 10/2012 | Simon |
| 2013/0107051 A1 | 5/2013 | Maruoka et al. |

\* cited by examiner

OBJECT DETECTION SYSTEM

CROSS REFERENCE TO RELATED APPLICATIONS

The present application is a continuation of U.S. patent application Ser. No. 15/196,076, filed Jun. 29, 2016, now U.S. Pat. No. 10,295,667, which is a continuation of U.S. patent application Ser. No. 14/319,164, filed Jun. 30, 2014, now U.S. Pat. No. 9,383,445, which is a continuation of U.S. patent application Ser. No. 13/242,991, filed Sep. 23, 2011, now U.S. Pat. No. 8,767,186, which is a continuation of U.S. patent application Ser. No. 12/266,656, filed Nov. 7, 2008, now U.S. Pat. No. 8,027,029, which claims the benefit of U.S. provisional application Ser. No. 60/986,016, filed Nov. 7, 2007, which is hereby incorporated herein by reference in its entirety.

BACKGROUND OF THE INVENTION

It is known to detect objects or other vehicles with camera vision systems. Examples of such vision systems are described in U.S. Pat. Nos. 5,796,094; 6,097,023; 6,320,176; 6,313,454; 6,559,435; 6,831,261; 6,396,397; 5,877,897; 6,498,620; 5,670,935; 6,806,452; 6,946,978; 7,123,168; 7,004,606; 7,005,974 and/or 5,550,677, which are hereby incorporated herein by reference in their entireties.

SUMMARY OF THE INVENTION

The present invention provides a road object detection and tracking systems that is based on the fusion of camera vision and Lidar technologies. The system and concept can provide driver assistance and safety functions, such as adaptive cruise control, stop and go control, pedestrian detection, front and rear collision warning, lane departure warning, side object detection, rear object detection, side and/or rear and/or front blind zone detection, and/or the like.

For the above mentioned driver assistance and safety applications, it is important to detect and identify objects on the road, and is desirable to measure object distance and relative speed to the driver's own vehicle (the host or subject vehicle). The proposed technology has the advantages over others to fulfill these requirements.

DESCRIPTION OF THE PREFERRED EMBODIMENTS

Figure 1:
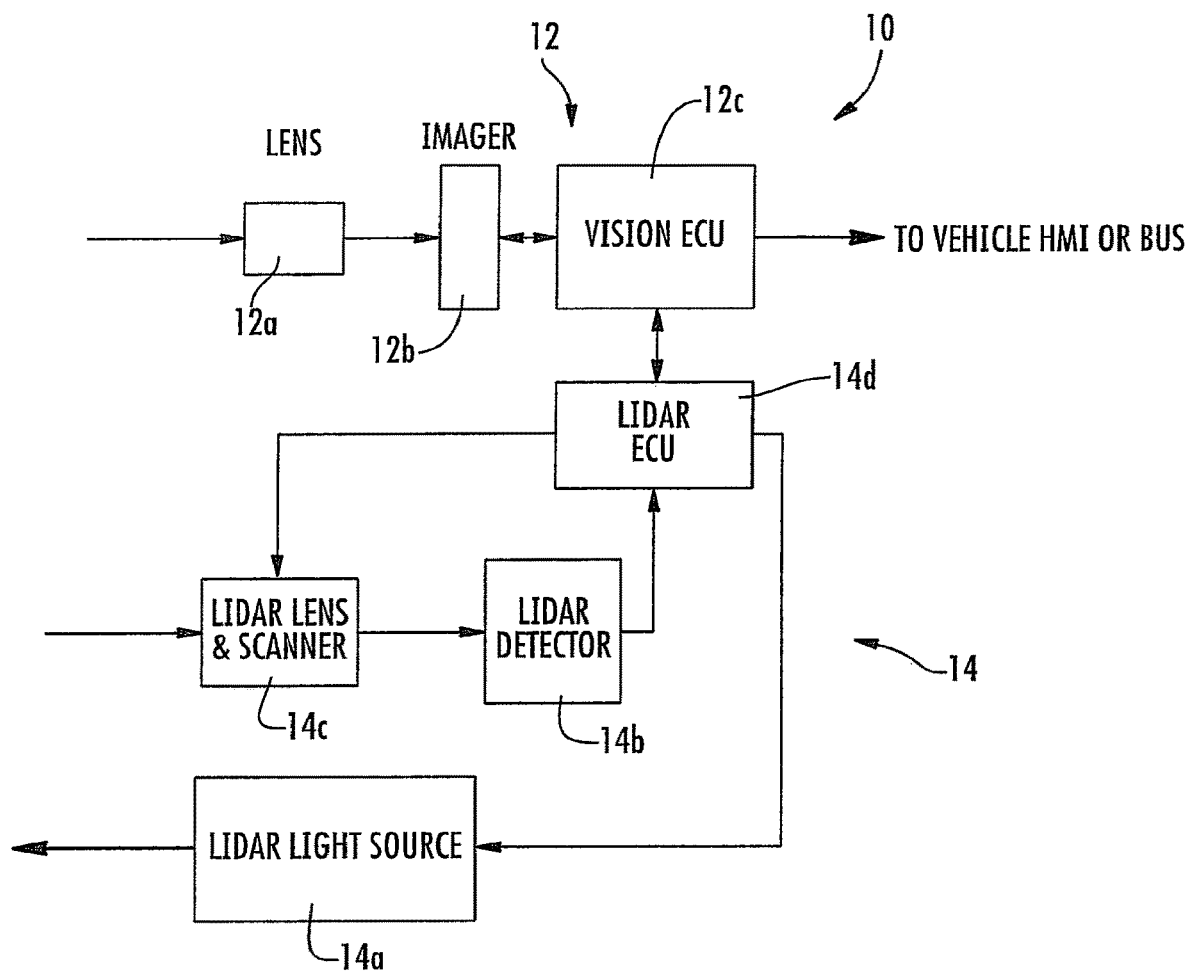
FIG. 1 is a block diagram of the Lidar and camera-based vision system of the present invention.

Referring now to the drawings and the illustrative embodiments depicted therein, a combined vision and Lidar system 10 of the present invention provides a combination of the core of Lidar and camera based vision modules (see FIG. 1). The camera vision module 12 is comprised of a lens 12a, an imager 12b, a vision ECU 12c and vision algorithm. The vision module detects and identifies objects in the field of view. The Lidar module or system 14 in general is comprised of a light source 14a, a light detector 14b, lenses for source and detector, a scanning device 14c, a modulation signal generator, a signal amplifier, and a signal processing unit 14d. Lidar system 14 measures object distance by comparing the modulation phase or calculating a time of flight of the light from the object (such as by utilizing processes such as those described in U.S. Pat. Nos. 6,825,455; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, which are hereby incorporated herein by reference in their entireties). Lateral and vertical resolution of a scene can be realized by mechanically scanning the light beam in a raster fashion, such as in a manner similar to known or conventional Lidar systems, such as those described in the patents incorporated by reference above. In the illustrated embodiment, and as shown in FIG. 1, the vision system camera 12b is used to provide lateral and vertical resolution of the scene. The mechanical scanner does not need to perform raster scanning; instead, the Lidar line of sight and/or source light is guided by the vision module to point to the objects of interest and measure the distances between the objects and the host or subject vehicle, as discussed below.

Figure 2A:
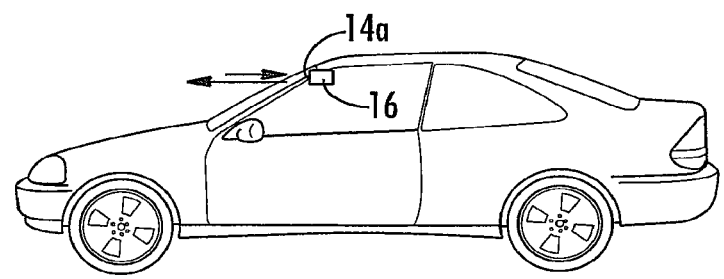
FIGS. 2A-C are side elevations of a vehicle having a Lidar and camera-based vision system incorporated therein in accordance with the present invention.
Figure 2B:
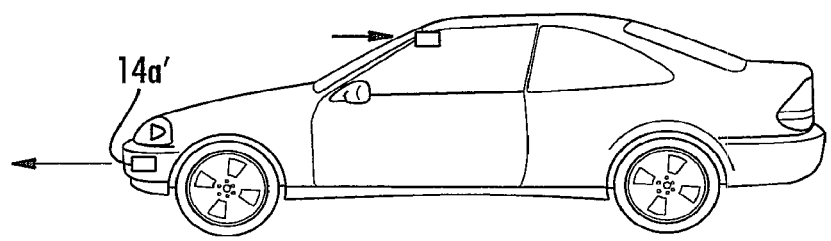
Figure 2C:
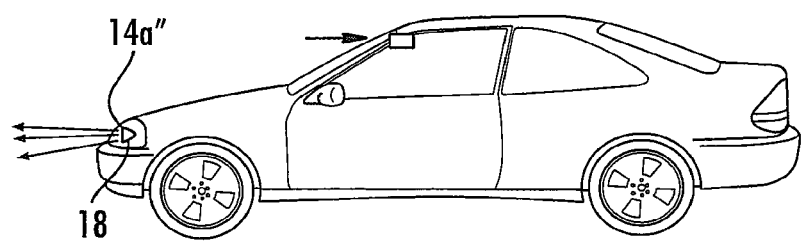

The Lidar light source can be any suitable light source, such as, for example, a laser operating in an infrared wavelength (or near infrared) and eye-safe, a LED or LED array operating in the infrared or near infrared region and eye-safe, and/or one or more vehicle headlamps. Optionally, for example, the laser or LEDs 14a can be mounted as a part of the camera-Lidar module that is mounted behind the rear view mirror 16 inside the vehicle compartment, such as shown in FIG. 2A. Optionally, the laser or LEDs 14a' can be mounted separately from camera-Lidar module, such as shown in FIG. 2B. Optionally, and as shown in FIG. 2C, the system may utilize the vehicle headlamp 18 as the Lidar light source 14a". In this case, high frequency pulse width modulation may be applied to the headlamp. Optionally, LEDs as the Lidar source can be built inside the headlamp assembly. Clearly, the Lidar source may comprise other light sources and/or may be disposed elsewhere at the vehicle while remaining within the spirit and scope of the present invention.

When using laser as the Lidar light source, the laser may be collinear to the detector line of sight and steered by the same steering mechanism. It can also be steered by a separate steering mechanism, which is synchronized with the detector line of sight steering. The boundary of the scanned light should match vision camera's field of view boundary. When using LEDs as the Lidar light source, the LED light should be collimated and then steered, or the LED(s) may be designed to spread the light to cover the whole field of view.

Figure 3A:
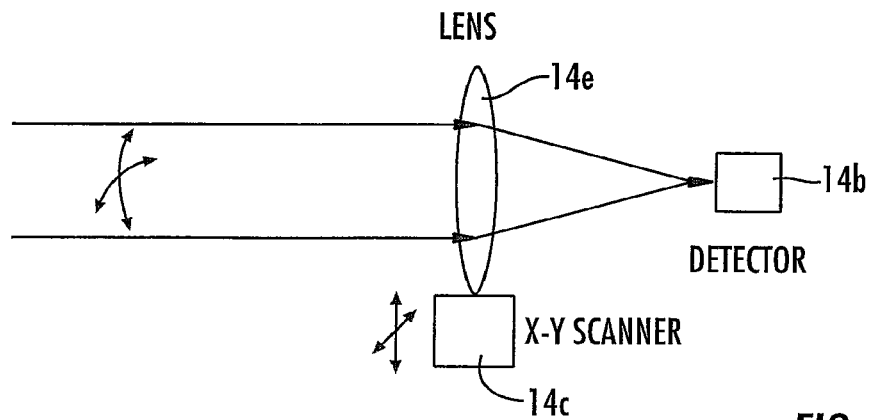
FIGS. 3A-D are schematics of different means for steering the Lidar light source and detector line of sight in accordance with the present invention.
Figure 3B:
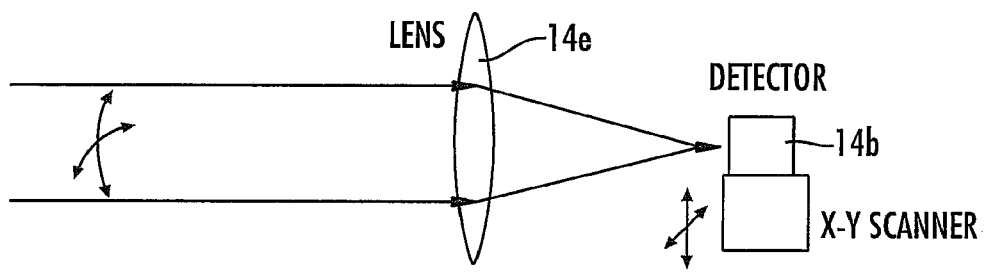
Figure 3C:
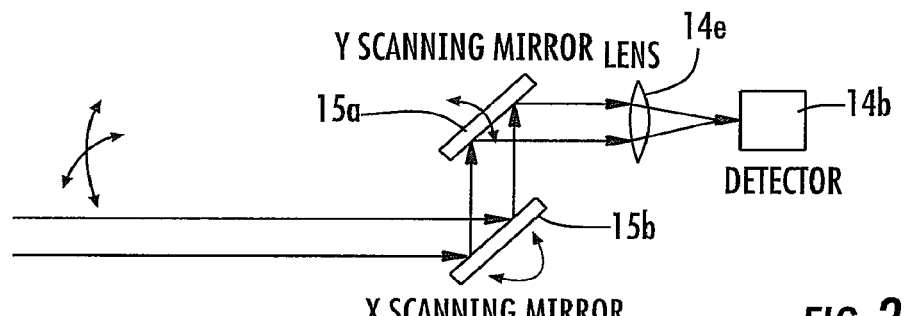
Figure 3D:
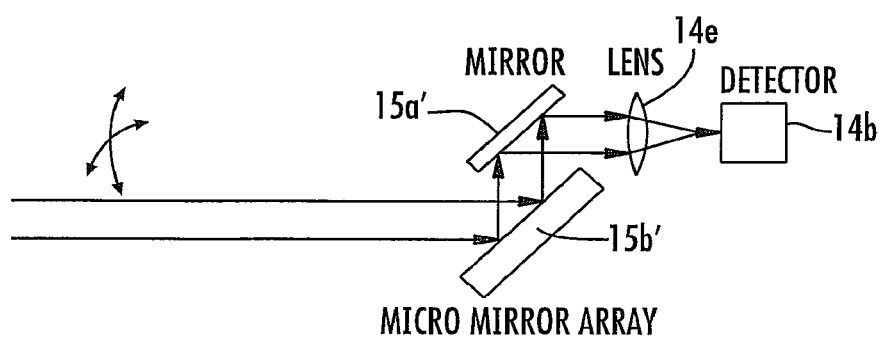

To provide a steering mechanism to the Lidar light source and detector line of sight, one can use any suitable steering means, such as, for example, via one of the following methods: (i) move the lens 14e in X and Y translational directions by mechanical means (FIG. 3A); (ii) move the detector 14b in X and Y translational directions by mechanical means (FIG. 3B); (iii) reflect light by two scanning mirrors 15a, 15b that rotate in orthogonal directions that equivalently provide X and Y movements (FIG. 3C); and/or (iv) reflect light by one or two micro mirror array (MEMS) devices 15a', 15b' that steer light in X and Y directions (FIG. 3D).

Optionally, the steering mechanisms described in FIGS. 3A and 3B can be realized by a "speaker coil" type actuator that moves the lens or detector, or a piezoelectric actuator that drives the lens or detector in translation motions, or a servo/step motor to drive the lens or detector in translation motions, or any other suitable means. Optionally, the steering mechanisms described in FIG. 3C can be realized by a "galvanometer" type scanning mirror, or a piezoelectric actuator to drive the lens or detector in rotation motions, or a servo/step motor to drive the lens or detector in rotation motions or other suitable means.

The basic sequence of the operation may include the following. The vision camera may acquire an image frame or frames at a certain rate (such as, for example, about 30 frames per second (fps) or thereabouts). The vision processing algorithm processes image(s) and identifies object(s) of interest in the field of view of the imager or camera. A signal or data indicative of the X and Y coordinates of the objects is communicated to a Lidar steering unit. The Lidar unit is steered to direct the light toward a first object based on the given coordinates and the unit may measure the distance to the first object, and the Lidar unit may be steered to direct the light toward a second object or objects and may measure distance to the next object or objects, and so on, until all objects and distances are measured. The system may calculate speed data for all objects if necessary or desired, and may feed the distance and speed data back to an object identification algorithm to improve object identification and prioritization. These steps may be repeated during operation of the system.

The system provides 3 dimensional and 1 timing information of a road object(s) relative to the vehicle that hosts the system. The information provided may include the X and Y coordinates of an object in the camera's field of view, the distance (Z) between the object(s) and the host vehicle, and the time of possible collision based on the speed of the object and the host vehicle.

The vision module acquires, processes and identifies objects that are of interest to the applications, such as vehicles, pedestrians, roadside buildings, traffic lights, traffic signs, tail lights and head lights, and/or the like. The vision system may also identify lane markers, curbs and/or road dividers to help to determine the lane that the host vehicle is in and where the other vehicles or objects are relative to that lane. Identifying if another vehicle is in the host vehicle's lane is useful for adaptive cruise control systems (ACC) and/or stop and go applications and/or collision warning applications. Algorithms that have already been developed in Lane Departure Warning systems can serve that purpose.

Lidar measures the distance from an object to the host vehicle. By adding this distance information to the 2-dimensional object position information, the algorithm can construct full 3-dimensional position information of an object or objects. The timing information given by the video frames, along with the host vehicle speed information (read from vehicle bus), enable the calculation of the object speeds. The distance and speed information can also feedback to the vision algorithm to help its object identification. Besides the X and Y coordinates of the objects that the camera vision module gives, the distance and speed information add two more dimensions to identify objects. In addition, lane mark information adds critical information for applications like ACC and collision warning. Based on the objects' 4-dimensional information and lane mark information, a map of road objects can be generated.

Priority scores can be assigned to all objects in the image. The priority scores represent the danger or importance of the objects detected in a scene. The objects with high priority scores have one, a few or all of the following characteristics:
  vehicles that are close to the host vehicle;
  vehicles that are closing to the host vehicle in relative speed and collision will happen in pre-determined time;
  vehicles that are in the same lane of the host vehicle;
  vehicles that are moving to the same lane of the host vehicle (a vehicle cut in the lane at a close distance in front of the host vehicle); and/or
  a pedestrian moving toward the center of the view.

Figure 4A:
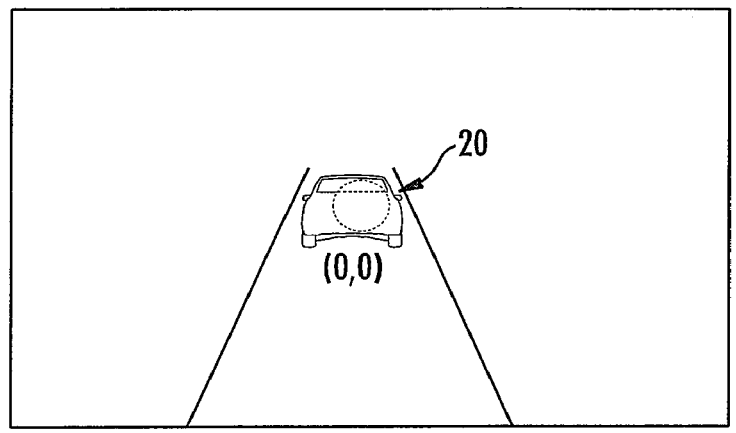
FIGS. 4A and 4B are images of the field of view of the imaging sensor or camera of the Lidar and camera based system of the present invention.
Figure 4B:
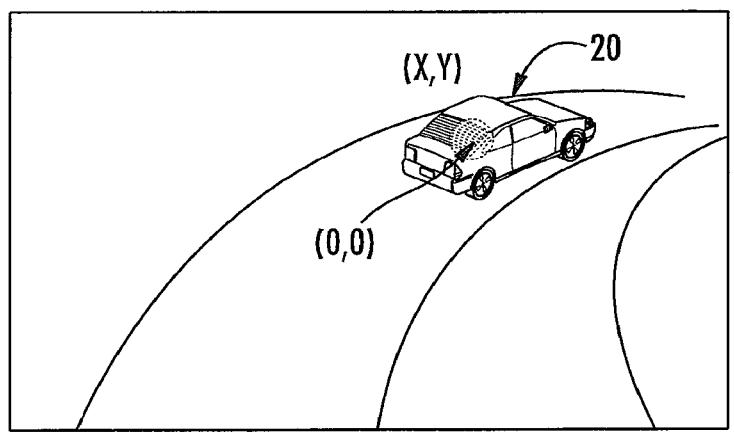

In traditional Lidar systems that provide and process a full field of view, the beam is scanned in raster fashion, or multiple detectors are scanned in sequence, in which case an equal amount of time is allocated to all of the objects in the field of view. However, the system in accordance with the present invention can assign different amounts of "staring" time to the different objects. A longer time may be assigned to the objects with higher priority scores. The coordinates of an object identified by the imager sensor guides the steering mechanism of the Lidar. The Lidar sight can track and stay on an object while the object moves in the camera's field of view. As can be seen with reference to FIGS. 4A and 4B, the coordinates (X, Y) may be given by the image sensor to an identified vehicle 20 in the field of view. The Lidar sight, which is represented by the circle in FIGS. 4A and 4B, is guided to point to the vehicle.

By staring for a longer time at one object or a limited number of objects in the field of view and avoiding time consuming mechanical steering across the scene, the Lidar can provide faster distance reading of one object or a limited number of objects in the field of view. The system provides the vehicle control module or modules with faster distance inputs, and thus allows quicker reaction time or speed and enhanced control to enhance avoidance of a collision with objects such as a pedestrian or another vehicle. For example, in an ACC application, the vehicle in front of the host vehicle and in the same lane has the highest priority score and will be stared by the Lidar for the most amount time and the system will update the distance data to the vehicle controllers more frequently, in order to maintain the safe distance and avoid a collision with the other vehicle. In pedestrian detection application, a pedestrian's distance and relative speed should be monitored to determine if his/her trajectory potentially runs into the host vehicle. The pedestrians who have more probability of running into the host vehicle are assigned higher priority scores and then they get a greater amount of the Lidar time and more frequent distance updates. In collision warning applications, the highest priority score may be assigned to a vehicle in the driver's or host vehicle's lane that is approaching to a position and speed that will collide with the driver's own vehicle within a pre-defined time. The system stares at the vehicle for most of the time and updates the distance information to the vehicle controller more frequently to allow the vehicle controllers to take quicker reaction. In stop-and-go applications, the system may track the nearest vehicle in front of the subject or host or equipped vehicle and in the same lane, and may identify, track and react to cut-in vehicle from next lanes. Those nearest vehicles or cut-in vehicles are assigned with most of the staring time and updates of distance measurement at the highest frequency in order to provide the vehicle controller a quicker reaction time or speed.

While the Lidar sight tracks high priority score objects for more time, it is also important to monitor low score objects at a reasonable frequency. Some objects may grow to higher priority ones and some objects may change to reduced priority scores. Continuous and real time monitoring and score assessment is desirable during operation of the system of the present invention.

Unlike the raster scanning mechanism in known Lidar systems (which have to scan a full raster field of view for each frame), the Lidar system of the present invention has advantages of faster steering and object tracking capability that are unique compared to competing technologies. By nature, the objects being tracked move slow in the horizontal and vertical directions in the camera and Lidar field of view. So the mechanical scanning takes much less time to track objects or hop or switch between the objects. In addition, the system does not have to waste scanning time in most of the "empty" space or spaces in the field of view that have no objects of interest. In other words, the system of the present invention can provide faster scene sampling rate or tracking speed than the regular raster scan Lidar system and multiple detector system. On the other hand, for the same or similar tracking speed, the present invention may require a relatively slower mechanical scanning speed, which may lead to a lower cost and higher durability of the scanning mechanics. Another advantage of the present invention is that the system of the present invention may provide a more efficient and accurate distance measurement, because it can stay at or process an object of interest for a longer time than the raster scanning Lidar does on the objects. Traditional raster scanning Lidar evenly spreads the beam in the full field of view and therefore has a shorter exposure time for each and every object in the field of view. Without wasting time on raster scanning, the system of the present invention can provide higher distance sampling rate than regular Lidar and Radar.

The system of the present invention may provide more accurate distance measurement because the Lidar beam can stay on an object for longer time. The system allows more pulses to be collected and special algorithms or techniques to be applied to enhance the detection sensitivity and confidence level. For example, the system may use a gated accumulation and average (Boxcar technique) of many pulses of light to increase the signal to noise ratio. Also, the system of the present invention may provide more accurate distance measurement because the object detection in the two dimensional image helps steer the Lidar beam in a more accurate angle. In addition, the distance reading of an object increases the confidence level of the two dimensional vision object detection, which in turn provides feedback to the Lidar and provides a more accurate distance measurement.

Another benefit of being able to "stare" longer on the object is that it provides enhanced performance in adverse weather conditions, such as rain or fog. One known disadvantage of known Lidar systems is the difficulty the system has in seeing long distances through rain or fog. The light is scattered or diffused by the water droplets in the rain and fog and causes the return light signal to be too weak to detect. However, by staying longer on objects, the system of the present invention can gather more light pulses and apply special methods and algorithms to enhance the detection sensitivity and confidence level. For example, one can use gated accumulation and average (Boxcar technique) of many pulses of light to increase signal to noise ratio.

The beam or line of sight steering needs to provide the field of view that is needed for matching the camera field of view and application needs. A focused Lidar source light and detection spot can deliver better resolution and higher sensitivity over known systems.

Camera vision provides high lateral and vertical resolution and the mature imaging processing technology allows sufficient or enhanced object identification, lane mark detection, and/or the like in high speed by utilizing mature color CMOS or CCD imagers. Lidar, on the other hand, provides excellent longitudinal resolution. Both are mature technologies with relative lower costs as compared with other competing technologies, such as Radar or the like. By combining these two technologies together, the present invention provides advantages in performance (such as high resolution in lateral, vertical and longitudinal dimensions; high detection and tracking speed; and reliable object identification and tracking), costs (such as due to the ability to combine circuits to share components; combine processor and memory; and lower speed mechanical scanning mechanics), size (smaller package size; main Lidar components can be integrated with the camera; and the system may be placed behind rear view mirror) and integration with existing vision-based systems, such as LDW, IHC, AFS, TSR and/or night vision systems and/or the like.

Applications of such a vision-Lidar fusion system include (i) adaptive cruise control (ACC), (ii) Stop and Go; (iii) pedestrian detection; (iv) collision warning at both front and rear sides of the vehicle; (v) predictive brake assist; (vi) side object detection, (vii) side blind zone object detection; (viii) rear blind zone object detection; (ix) parking assist; and/or (x) lane change aid detection (a side object detection system may include both blind zone and lane change aid functions) and/or the like.

Therefore, the present invention provides enhanced processing techniques over prior art technology, including scanning Lidar (which scans the whole field of view and has a slower tracking speed and is not as good at identifying objects in a complex scene and is not as good at detection in fog or rain); Radar (which is expensive and has a low horizontal resolution (only a few lobes) and is not as good at identifying objects in a complex scene); stereo vision (which requires two cameras and needs a wide baseline and rigid body, requires complex stereo image processing and has its distance accuracy limited by the camera separation); 2-D vision (which requires complex image processing and is not as accurate in measuring distances and does not provide reliable distance information for variable sizes of detected vehicles); range imager (an imager technology that can measure object distance by time of flight of the light pulses emitted by the light emitter, in addition to regular 2D image, and with the distance sensing being at the imager chip level, which is a complex semiconductor sensor fabrication and is a higher cost system).

Optionally, the imaging sensor of the present invention may comprise a two-dimensional pixelated imaging array having a plurality of photo-sensing pixels arranged or disposed or established on a semiconductor substrate. For example, the imaging sensor may comprise a complementary-metal-oxide-semiconductor (CMOS) or a CCD imaging sensor or device or the like, and may utilize aspects of the imaging sensors described in U.S. Pat. Nos. 5,796,094; 6,097,023; 6,320,176; 6,313,454; 6,559,435; 6,831,261; 6,396,397; 5,877,897; 6,498,620; 5,670,935; 5,760,962; 6,806,452; 6,946,978; 7,339,149; 7,123,168; 7,004,606; 7,005,974 and/or 5,550,677, and/or PCT Application No. PCT/US07/75702, filed Aug. 10, 2007 and published as International Publication No. WO 2008/024639, and/or U.S. patent application Ser. No. 11/239,980, filed Sep. 30, 2005, now U.S. Pat. No. 7,881,496; Ser. No. 11/105,757, filed Apr. 14, 2005, now U.S. Pat. No. 7,526,103; and/or Ser. No. 10/534,632, filed May 11, 2005, now U.S. Pat. No. 7,965, 336, and/or International Publication Nos. WO 2004/047421 and/or PCT WO 07/053404, which are hereby incorporated herein by reference in their entireties.

Optionally, the system may include any imaging sensor or sensors, and may utilize aspects of various vision or imaging or detection systems, such as, for example, blind spot detection systems described in U.S. Pat. Nos. 7,038,577; 6,882,287; 6,198,409; 5,929,786 and/or 5,786,772, and/or U.S. patent application Ser. No. 11/239,980, filed Sep. 30, 2005, now U.S. Pat. No. 7,881,496; and/or Ser. No. 11/315, 675, filed Dec. 22, 2005, now U.S. Pat. No. 7,720,580; and/or U.S. provisional applications, Ser. No. 60/638,687, filed Dec. 23, 2004; Ser. No. 60/628,709, filed Nov. 17, 2004; Ser. No. 60/614,644, filed Sep. 30, 2004; and/or Ser. No. 60/618,686, filed Oct. 14, 2004, and/or road surface detection systems, such as of the types described in U.S. patent application Ser. No. 11/948,086, filed Nov. 30, 2007 and published as U.S. Publication No. US 2008-0129541, and U.S. provisional application Ser. No. 60/872,270, filed Dec. 1, 2006, and/or reverse or backup aid systems, such as rearwardly directed vehicle vision systems of the types described in U.S. Pat. Nos. 7,005,974; 5,550,677; 5,760, 962; 5,670,935; 6,201,642; 6,396,397; 6,498,620; 6,717,610 and/or 6,757,109, and/or of automatic headlamp control systems of the types described in U.S. Pat. Nos. 5,796,094 and/or 5,715,093, and/or U.S. patent application Ser. No. 11/105,757, filed Apr. 14, 2005, now U.S. Pat. No. 7,526, 103, and/or U.S. provisional application Ser. No. 60/607, 963, filed Sep. 8, 2004, and/or rain sensors or rain sensing systems of the types described in U.S. Pat. Nos. 6,250,148 and 6,341,523, and/or of other imaging or detecting systems, such as the types described in U.S. Pat. Nos. 6,353,392 and 6,313,454, and/or U.S. patent application Ser. No. 11/948, 086, filed Nov. 30, 2007 and published as U.S. Publication No. US 2008-0129541; Ser. No. 12/171,436, filed Jul. 11, 2008, now U.S. Pat. No. 7,914,187, and/or Ser. No. 12/190, 698, filed Aug. 13, 2008, now U.S. Pat. No. 8,017,898, and/or U.S. provisional applications, Ser. No. 60/872,270, filed Dec. 1, 2006; Ser. No. 60/949,352, filed Jul. 12, 2007; Ser. No. 60/956,633, filed Aug. 17, 2007, and/or PCT Application No. PCT/US07/75702, filed Aug. 10, 2007 and published as International Publication No. WO 2008/ 024639, and/or PCT Application No. PCT/US08/78700, filed Oct. 3, 2008 and published as International Publication No. WO 2009/046268, and/or PCT Application No. PCT/ US08/76022, filed Sep. 11, 2008 and published as International Publication No. WO 2009/036176, with all of the above referenced U.S. patents, patent applications and provisional applications and PCT applications being commonly assigned and being hereby incorporated herein by reference in their entireties.

Optionally, the imaging sensor may be suitable for use in connection with other vehicle imaging systems, such as, for example, a blind spot detection system, where a blind spot indicator may be operable to provide an indication to the driver of the host vehicle that an object or other vehicle has been detected in the lane or area adjacent to the side of the host vehicle. In such a blind spot detector/indicator system, the blind spot detection system may include an imaging sensor or sensors, or ultrasonic sensor or sensors, or sonar sensor or sensors or the like. For example, the blind spot detection system may utilize aspects of the blind spot detection and/or imaging and/or indicating systems described in U.S. Pat. Nos. 7,038,577; 6,882,287; 6,198, 409; 5,929,786 and/or 5,786,772, and/or U.S. patent application Ser. No. 11/315,675, filed Dec. 22, 2005, now U.S. Pat. No. 7,720,580; Ser. No. 11/239,980, filed Sep. 30, 2005, now U.S. Pat. No. 7,881,496 and/or Ser. No. 11/933,697, filed Nov. 1, 2007, now U.S. Pat. No. 7,777,611, and/or International Publication Nos. WO 2007/005942 and/or WO 2008/051910, and/or U.S. provisional applications, Ser. No. 60/618,686, filed Oct. 14, 2004; Ser. No. 60/853,850, filed Oct. 24, 2006; Ser. No. 60/918,089, filed Mar. 15, 2007; Ser. No. 60/970,687, filed Sep. 7, 2007; and/or Ser. No. 60/857, 025, filed Nov. 6, 2006, and/or of the reverse or backup aid systems, such as the rearwardly directed vehicle vision systems described in U.S. Pat. Nos. 5,550,677; 5,760,962; 5,670,935; 6,201,642; 6,396,397; 6,498,620; 6,717,610; 6,757,109 and/or 7,005,974, and/or of the rain sensors described in U.S. Pat. Nos. 6,250,148 and 6,341,523, and/or of other imaging systems, such as the types described in U.S. Pat. Nos. 7,123,168; 6,353,392 and 6,313,454, with all of the above referenced U.S. patents, patent applications and provisional applications and PCT applications being commonly assigned and being hereby incorporated herein by reference in their entireties.

Typically, customer specifications may require blind spot sensors, such as blind spot radar sensors and the like, to detect when they are blind due to the buildup of dirt, ice or snow in front of the sensor. This is also true for side object detections sensors which include side blind spot and lane change aid sensors. In practice, for many of these sensors, meeting those requirements can present a challenge, since the buildup cannot be actively detected, but rather has to be inferred from the lack of radar returns over a longer time. That works adequately in driving environments that have a lot of natural returns or objects for the system to detect as the vehicle travels along the road (such as guardrails and/or other vehicles and/or the like), but on some roads (such as some elevated roads where a sensor may not detect any object to the side of the host vehicle for minutes), such a system may fail. If the host vehicle is driven along such roads (such as some elevated roads in Sweden where a blind spot detecting sensor may not see anything for minutes), the absence of such a detection may trigger the blockage detection sensor. It is thus envisioned that such a blind spot detection system be combined with an input from a forward facing camera of the vehicle (such as a camera that is part of a headlamp control system or lane departure warning system or object detection system or the like of the vehicle). Thus, a blockage detection at the BSD sensor may be determined by the lack of detection of an object after that object is detected by the forward facing camera. For example, if the front sensor or camera detects that the host vehicle is passing another vehicle or structure, but the blind spot detecting sensor does not detect the object a short period of time later (depending on the speed of the vehicle), the system can determine that the blind spot detecting sensor has a blockage, whereby the system can detect such blockages much quicker than previously possible.

Changes and modifications to the specifically described embodiments may be carried out without departing from the principles of the present invention, which is intended to be limited only by the scope of the appended claims, as interpreted according to the principles of patent law.

The invention claimed is:

1. An object detection system suitable for use in a vehicle, said object detection system comprising:

a camera vision module configured for mounting at an in-cabin side of a windshield of a vehicle equipped with said object detection system;

wherein said camera vision module comprises an imaging device viewing through the windshield to the exterior of the equipped vehicle when said camera vision module is mounted at the windshield of the equipped vehicle, the imaging device having a field of view forward of the equipped vehicle and operable to capture image data representative of a scene in a direction of forward travel of the equipped vehicle;

the imaging device comprising a two-dimensional pixelated imaging array having a plurality of photo-sensing pixels arranged on a semiconductor substrate;

a Lidar module configured for mounting at a front exterior portion of the equipped vehicle;

wherein said Lidar module comprises a Lidar device that, with said Lidar module mounted at the front exterior portion of the equipped vehicle, scans a region forward of the equipped vehicle, the Lidar device operable to capture Lidar data representative of the scene in the direction of forward travel of the equipped vehicle;

wherein the region scanned by the Lidar device overlaps with the field of view of the imaging device;

a control comprising an image processor;

wherein, based at least in part on processing at the control of image data captured by the imaging device and based at least in part on processing at the control of Lidar data captured by the Lidar device, multiple objects present within the region scanned by the Lidar device that overlaps with the field of view of the imaging device are detected;

wherein, based at least in part on processing at the control of image data captured by the imaging device and based at least in part on processing at the control of Lidar data captured by the Lidar device, 3-dimensional and timing information relative to the equipped vehicle of the multiple objects present within the region scanned by the Lidar device that overlaps with the field of view of the imaging device is algorithmically constructed;

wherein the 3-dimensional and timing information relative to the equipped vehicle of the multiple objects present within the region scanned by the Lidar device that overlaps with the field of view of the imaging device comprises (i) X and Y coordinates relative to the equipped vehicle of individual objects of the multiple objects present within the region scanned by the Lidar device that overlaps with the field of view of the imaging device, (ii) distance (Z) between individual objects of the multiple objects and the equipped vehicle and (iii) time of possible collision between individual objects of the multiple objects and the equipped vehicle; and wherein at least one individual object of the multiple objects present within the region scanned by the Lidar device that overlaps with the field of view of the imaging device is prioritized based on at least one selected from the group consisting of (i) proximity to the equipped vehicle of the at least one individual object present within the region scanned by the Lidar device that overlaps with the field of view of the imaging device to the equipped vehicle, (ii) speed relative to the equipped vehicle of the at least one individual object present within the region scanned by the Lidar device that overlaps with the field of view of the imaging device and (iii) location relative to the equipped vehicle of the at least one individual object present within the region scanned by the Lidar device that overlaps with the field of view of the imaging device.

2. The object detection system of claim 1, wherein the prioritized at least one individual object present within the region scanned by the Lidar device that overlaps with the field of view of the imaging device comprises a pedestrian.

3. The object detection system of claim 2, wherein, based at least in part on processing by the image processor of captured image data, trajectory of the pedestrian relative to the equipped vehicle is monitored.

4. The object detection system of claim 2, wherein, based at least in part on processing by the image processor of captured image data, trajectory of the pedestrian relative to the equipped vehicle that potentially intersects with the equipped vehicle is determined.

5. The object detection system of claim 4, wherein, based at least in part on processing by the image processor of captured image data and upon determination that trajectory of the pedestrian relative to the equipped vehicle potentially intersects with the equipped vehicle, capture by the Lidar device of Lidar data related to the pedestrian is enhanced.

6. The object detection system of claim 1, wherein the at least one prioritized individual object present within the region scanned by the Lidar device that overlaps with the field of view of the imaging device comprises another vehicle.

7. The object detection system of claim 6, wherein, based at least in part on processing by the image processor of captured image data, the other vehicle is determined to be the nearest vehicle in front of the equipped vehicle.

8. The object detection system of claim 6, wherein, when the equipped vehicle is travelling in a traffic lane on a road the equipped vehicle is travelling along and based at least in part on processing by the image processor of captured image data, the other vehicle is determined to be travelling in the same traffic lane that the equipped vehicle is in.

9. The object detection system of claim 6, wherein, when the equipped vehicle is travelling in a traffic lane on a road the equipped vehicle is travelling along and based at least in part on processing by the image processor of captured image data, the other vehicle is determined (i) to be the nearest vehicle in front of the equipped vehicle and (ii) to be travelling in a traffic lane that is next to the traffic lane the equipped vehicle is travelling in.

10. The object detection system of claim 9, wherein, based at least in part on processing by the image processor of captured image data, the other vehicle is determined to be travelling in a direction of travel that is same as the direction of travel of the equipped vehicle.

11. The object detection system of claim 10, wherein, based at least in part on processing by the image processor of captured image data, the other vehicle travelling in the traffic lane next to the traffic lane the equipped vehicle is travelling in is tracked and identified to be a cut-in vehicle if the other vehicle moves from the next traffic lane to the traffic lane the equipped vehicle is travelling in.

12. The object detection system of claim 1, wherein, responsive at least in part to image processing of captured image data by the image processor, a light beam emitted by a light source of the equipped vehicle impinges the object present forward of the equipped vehicle.

13. The object detection system of claim 1, wherein the Lidar device comprises a light source, a detector and a scanner.

14. The object detection system of claim 13, wherein the scanner comprises at least one mirror.

15. The object detection system of claim 13, wherein the scanner comprises a micro mirror array.

16. The object detection system of claim 13, wherein the Lidar device determines distance to objects present forward of the equipped vehicle via a time of flight calculation.

17. The object detection system of claim 1, wherein the at least one prioritized individual object present forward of the equipped vehicle comprises another vehicle, and wherein, at least in part responsive to image processing by the image processor of captured image data, speed of the other vehicle present exterior of the equipped vehicle relative to the equipped vehicle is calculated.

18. The object detection system of claim 1, wherein the at least one prioritized individual object is prioritized based on potential danger of the individual object to the equipped vehicle.

19. The object detection system of claim 18, wherein the at least one prioritized individual object comprises a pedestrian who is present in the field of view of the imaging device.

20. The object detection system of claim 19, wherein a light beam emitted from the equipped vehicle at least one of (a) tracks the pedestrian while the pedestrian moves in the field of view of the imaging device and (b) stays on the pedestrian while the pedestrian moves in the field of view of the imaging device.

21. The object detection system of claim 19, wherein, at least in part responsive to image processing by the image processor of captured image data, the pedestrian present in the field of view of the imaging device is assigned a high priority when the pedestrian is moving toward the center of the field of view of the imaging device.

22. The object detection system of claim 1, wherein the at least one prioritized individual object present within the region scanned by the Lidar device that overlaps with the field of view of the imaging device comprises another vehicle, and wherein the other vehicle is assigned a high priority when the other vehicle has one or more characteristic selected from the group consisting of (i) is closing with the equipped vehicle and collision will happen in a predetermined time, (ii) is in the same lane as that of the equipped vehicle and (iii) is moving so as to cut into a traffic lane the equipped vehicle is travelling in at a close distance in front of the equipped vehicle.

23. The object detection system of claim 1, wherein the front exterior portion at which said Lidar module is configured for mounting comprises a front fender portion of the equipped vehicle.

24. The object detection system of claim 1, wherein the front exterior portion at which said Lidar module is configured for mounting comprises a front headlamp of the equipped vehicle.

25. The object detection system of claim 1, wherein the at least one prioritized individual object of the multiple objects present within the region scanned by the Lidar device that overlaps with the field of view of the imaging device is prioritized based on (i) proximity to the equipped vehicle of the individual object present within the region scanned by the Lidar device that overlaps with the field of view of the imaging device to the equipped vehicle, (ii) speed relative to the equipped vehicle of the individual object present within the region scanned by the Lidar device that overlaps with the field of view of the imaging device and (iii) location relative to the equipped vehicle of the individual object present within the region scanned by the Lidar device that overlaps with the field of view of the imaging device.

26. The object detection system of claim 25, wherein the at least one prioritized individual object comprises a pedestrian.

27. The object detection system of claim 25, wherein the at least one prioritized individual object comprises another vehicle.

28. The object detection system of claim 1, wherein, responsive at least in part to image processing of captured image data by the image processor, a traffic lane in which the equipped vehicle is travelling is identified.

29. The object detection system of claim 28, wherein, responsive at least in part to image processing of captured image data by the image processor, where other vehicles and other objects are relative to the traffic lane in which the equipped vehicle is travelling along is determined.

30. The object detection system of claim 28, wherein, responsive at least in part to image processing of captured image data by the image processor, lane markers of the traffic lane in which the equipped vehicle is travelling are detected.

31. The object detection system of claim 28, wherein, responsive at least in part to image processing of captured image data by the image processor, a curb of a road along which the equipped vehicle is travelling is detected.

32. The object detection system of claim 28, wherein the imaging device captures image data for an adaptive cruise control system of the equipped vehicle.

33. The object detection system of claim 28, wherein the imaging device captures image data for an intelligent headlighting system of the equipped vehicle.

34. The object detection system of claim 28, wherein the imaging device captures image data for a lane departure warning system of the equipped vehicle.

35. The object detection system of claim 28, wherein the imaging device captures image data for an adaptive front lighting system of the equipped vehicle.

36. The object detection system of claim 28, wherein the imaging device captures image data for a traffic sign recognition system of the equipped vehicle.

37. The object detection system of claim 28, wherein the imaging device captures image data for a stop and go system of the equipped vehicle.

38. The object detection system of claim 28, wherein the imaging device captures image data for a pedestrian detection system of the equipped vehicle.

39. An object detection system suitable for use in a vehicle, said object detection system comprising:

a camera vision module configured for mounting at an in-cabin side of a windshield of a vehicle equipped with said object detection system;

wherein said camera vision module comprises an imaging device viewing through the windshield to the exterior of the equipped vehicle when said camera vision module is mounted at the windshield of the equipped vehicle, the imaging device having a field of view forward of the equipped vehicle and operable to capture image data representative of a scene in a direction of forward travel of the equipped vehicle;

the imaging device comprising a two-dimensional pixelated CMOS imaging array having a plurality of photo-sensing pixels arranged on a semiconductor substrate;

a Lidar module configured for mounting at a front exterior portion of the equipped vehicle;

wherein said Lidar module comprises a Lidar device that, with said Lidar module mounted at the front exterior portion of the equipped vehicle, scans a region forward of the equipped vehicle, the Lidar device operable to capture Lidar data representative of the scene in the direction of forward travel of the equipped vehicle;

wherein the region scanned by the Lidar device overlaps with the field of view of the imaging device;

a control comprising an image processor;

wherein, based at least in part on processing at the control of image data captured by the imaging device and based at least in part on processing at the control of Lidar data captured by the Lidar device, multiple objects present within the region scanned by the Lidar device that overlaps with the field of view of the imaging device are detected;

wherein, based at least in part on processing at the control of image data captured by the imaging device and based at least in part on processing at the control of Lidar data captured by the Lidar device, 3-dimensional and timing information relative to the equipped vehicle of the multiple objects present within the region scanned by the Lidar device that overlaps with the field of view of the imaging device is algorithmically constructed;

wherein the multiple objects within the region scanned by the Lidar device that overlaps with the field of view of the imaging device comprise a pedestrian;

wherein the 3-dimensional and timing information relative to the equipped vehicle of the pedestrian present within the region scanned by the Lidar device that overlaps with the field of view of the imaging device comprises (i) X and Y coordinates relative to the equipped vehicle of the pedestrian present within the region scanned by the Lidar device that overlaps with the field of view of the imaging device, (ii) distance (Z) between the pedestrian and the equipped vehicle and (iii) time of possible collision between the pedestrian and the equipped vehicle; and wherein the pedestrian present within the region scanned by the Lidar device that overlaps with the field of view of the imaging device is prioritized based on at least one selected from the group consisting of (i) proximity to the equipped vehicle of the pedestrian present within the region scanned by the Lidar device that overlaps with the field of view of the imaging device to the equipped vehicle, (ii) speed relative to the equipped vehicle of the pedestrian present within the region scanned by the Lidar device that overlaps with the field of view of the imaging device and (iii) location relative to the equipped vehicle of the pedestrian present within the region scanned by the Lidar device that overlaps with the field of view of the imaging device.

40. The object detection system of claim 39, wherein, based at least in part on processing by the image processor of captured image data, trajectory of the pedestrian relative to the equipped vehicle is monitored.

41. The object detection system of claim 39, wherein, based at least in part on processing by the image processor of captured image data, trajectory of the pedestrian relative to the equipped vehicle that potentially intersects with the equipped vehicle is determined.

42. The object detection system of claim 41, wherein, based at least in part on processing by the image processor of captured image data and upon determination that trajectory of the pedestrian relative to the equipped vehicle potentially intersects with the equipped vehicle, capture by the Lidar device of Lidar data related to the pedestrian is enhanced.

43. The object detection system of claim 39, wherein the Lidar device comprises a light source, a detector and a scanner, and wherein the scanner comprises a micro mirror array.

44. The object detection system of claim 43, wherein a light beam emitted from the equipped vehicle at least one of (a) tracks the pedestrian while the pedestrian moves in the field of view of the imaging device and (b) stays on the pedestrian while the pedestrian moves in the field of view of the imaging device.

45. The object detection system of claim 43, wherein, at least in part responsive to image processing by the image processor of captured image data, the pedestrian present in the field of view of the imaging device is assigned a high priority when the pedestrian is moving toward the center of the field of view of the imaging device.

46. The object detection system of claim 43, wherein, responsive at least in part to image processing of captured image data by the image processor, a traffic lane in which the equipped vehicle is travelling is identified, and wherein, responsive at least in part to image processing of captured image data by the image processor, lane markers of the traffic lane in which the equipped vehicle is travelling are detected.

47. The object detection system of claim 46, wherein, responsive at least in part to image processing of captured image data by the image processor, a curb of a road along which the equipped vehicle is travelling is detected.

48. The object detection system of claim 46, wherein the imaging device captures image data for a traffic sign recognition system of the equipped vehicle.

49. The object detection system of claim 43, wherein the imaging device captures image data for an adaptive cruise control system of the equipped vehicle.

50. The object detection system of claim 43, wherein the imaging device captures image data for an adaptive front lighting system of the equipped vehicle.

51. The object detection system of claim 43, wherein the imaging device captures image data for a stop and go system of the equipped vehicle.

52. An object detection system suitable for use in a vehicle, said object detection system comprising:

a camera vision module configured for mounting at an in-cabin side of a windshield of a vehicle equipped with said object detection system;

wherein said camera vision module comprises an imaging device viewing through the windshield to the exterior of the equipped vehicle when said camera vision module is mounted at the windshield of the equipped vehicle, the imaging device having a field of view forward of the equipped vehicle and operable to capture image data representative of a scene in a direction of forward travel of the equipped vehicle;

the imaging device comprising a two-dimensional pixelated CMOS imaging array having a plurality of photo-sensing pixels arranged on a semiconductor substrate;

a Lidar module configured for mounting at a front exterior portion of the equipped vehicle;

wherein said Lidar module comprises a Lidar device that, with said Lidar module mounted at the front exterior portion of the equipped vehicle, scans a region forward of the equipped vehicle, the Lidar device operable to capture Lidar data representative of the scene in the direction of forward travel of the equipped vehicle;

wherein the region scanned by the Lidar device overlaps with the field of view of the imaging device;

a control comprising an image processor;

wherein, based at least in part on processing at the control of image data captured by the imaging device and based at least in part on processing at the control of Lidar data captured by the Lidar device, multiple objects present within the region scanned by the Lidar device that overlaps with the field of view of the imaging device are detected;

wherein, based at least in part on processing at the control of image data captured by the imaging device and based at least in part on processing at the control of Lidar data captured by the Lidar device, 3-dimensional and timing information relative to the equipped vehicle of the multiple objects present within the region scanned by the Lidar device that overlaps with the field of view of the imaging device is algorithmically constructed;

wherein the multiple objects present within the region scanned by the Lidar device that overlaps with the field of view of the imaging device comprise another vehicle;

wherein the 3-dimensional and timing information relative to the equipped vehicle of the other vehicle present within the region scanned by the Lidar device that overlaps with the field of view of the imaging device comprises (i) X and Y coordinates relative to the equipped vehicle of the other vehicle present within the region scanned by the Lidar device that overlaps with the field of view of the imaging device, (ii) distance (Z) between the other vehicle and the equipped vehicle and (iii) time of possible collision between the other vehicle and the equipped vehicle; and wherein the other vehicle present within the region scanned by the Lidar device that overlaps with the field of view of the imaging device is prioritized based on at least one selected from the group consisting of (i) proximity to the equipped vehicle of the other vehicle present within the region scanned by the Lidar device that overlaps with the field of view of the imaging device to the equipped vehicle, (ii) speed relative to the equipped vehicle of the other vehicle present within the region scanned by the Lidar device that overlaps with the field of view of the imaging device and (iii) location relative to the equipped vehicle of the other vehicle present within the region scanned by the Lidar device that overlaps with the field of view of the imaging device.

53. The object detection system of claim 52, wherein the other vehicle present within the region scanned by the Lidar device that overlaps with the field of view of the imaging device is prioritized based on potential danger of the other vehicle to the equipped vehicle.

54. The object detection system of claim 52, wherein, based at least in part on processing by the image processor of captured image data, the other vehicle is determined to be the nearest vehicle in front of the equipped vehicle.

55. The object detection system of claim 52, wherein, when the equipped vehicle is travelling in a traffic lane on a road the equipped vehicle is travelling along and based at least in part on processing by the image processor of captured image data, the other vehicle is determined (i) to be the nearest vehicle in front of the equipped vehicle and (ii) to be travelling in a traffic lane that is next to the traffic lane the equipped vehicle is travelling in.

56. The object detection system of claim 52, wherein the Lidar device comprises a light source, a detector and a scanner, and wherein the scanner comprises a micro mirror array.

57. The object detection system of claim 56, wherein, responsive at least in part to image processing of captured image data by the image processor, a traffic lane in which the equipped vehicle is travelling is identified, and wherein, responsive at least in part to image processing of captured image data by the image processor, lane markers of the traffic lane in which the equipped vehicle is travelling are detected.

58. The object detection system of claim 52, wherein, responsive at least in part to image processing of captured image data by the image processor, a curb of a road along which the equipped vehicle is travelling is detected.

59. The object detection system of claim 52, wherein the imaging device captures image data for an adaptive cruise control system of the equipped vehicle.

60. The object detection system of claim 52, wherein the imaging device captures image data for an adaptive front lighting system of the equipped vehicle.

61. The object detection system of claim 52, wherein the imaging device captures image data for a traffic sign recognition system of the equipped vehicle.

62. The object detection system of claim 52, wherein the imaging device captures image data for a stop and go system of the equipped vehicle.

63. The object detection system of claim 52, wherein, when the equipped vehicle is travelling in a traffic lane on a road the equipped vehicle is travelling along and based at least in part on processing by the image processor of captured image data, the other vehicle is determined to be travelling in the same traffic lane that the equipped vehicle is in.

64. The object detection system of claim 52, wherein, based at least in part on processing by the image processor of captured image data, the other vehicle is determined to be travelling in a direction of travel that is same as the direction of travel of the equipped vehicle.

65. The object detection system of claim 52, wherein, based at least in part on processing by the image processor of captured image data, the other vehicle travelling in the traffic lane next to the traffic lane the equipped vehicle is travelling in is tracked and identified to be a cut-in vehicle if the other vehicle moves from the next traffic lane to the traffic lane the equipped vehicle is travelling in.

* * * * *